United States Patent [19]
Arai

[11] Patent Number: 5,357,355
[45] Date of Patent: Oct. 18, 1994

[54] DOUBLE SIDED THIN PANEL DISPLAY UNIT FOR DISPLAYING THE SAME IMAGE

[75] Inventor: Ryoichi Arai, Tokyo, Japan
[73] Assignee: NEC Corporation, Japan
[21] Appl. No.: 882,817
[22] Filed: May 14, 1992
[30] Foreign Application Priority Data
  Jun. 7, 1991 [JP] Japan .................... 3-136412
[51] Int. Cl.$^5$ .............. G02F 1/1335; G02F 1/13; G02F 1/133
[52] U.S. Cl. ...................... 359/39; 359/50; 359/53; 40/448; 345/5
[58] Field of Search ............ 359/50, 53, 39; 40/448, 40/542; 345/4, 5

[56] References Cited
U.S. PATENT DOCUMENTS

| | | | |
|---|---|---|---|
| 4,799,050 | 1/1989 | Prince et al. | 359/50 |
| 5,115,228 | 5/1992 | Harris et al. | 359/36 |
| 5,121,234 | 6/1992 | Kucera | 359/50 |

Primary Examiner—William L. Sikes
Assistant Examiner—Ron Trice
Attorney, Agent, or Firm—Laff, Whitesel, Conte & Saret

[57] ABSTRACT

A double sided panel display unit produces visual images on both side thereof, and comprises a luminescent panel display with a transparent substrate, a liquid crystal shutter sandwiched between two polarizing plates different in angle of polarization at 90 degrees, and a liquid crystal display supplied with light through the transparent substrate, wherein the liquid crystal shutter and the liquid crystal display are controlled in such a manner that the same visual images are displayed on the polarizing plate as well as on the liquid crystal display, thereby achieving a thin double sided panel display with a small number of components.

3 Claims, 4 Drawing Sheets

DOUBLE SIDED THIN PANEL DISPLAY UNIT FOR DISPLAYING THE SAME IMAGE

FIELD OF THE INVENTION

This invention relates to a panel display unit such as, for example, a plasma display unit and, more particularly, to a double sided panel display unit having screens on both sides thereof.

DESCRIPTION OF THE RELATED ART

If an operator manipulates a panel display unit in face-to-face relation with customers, it is convenient to display the same visual images indicative of numerals and/or a message on both sides of the panel display unit incorporated in an ECR (abbreviation of Electric Cash Register) system or in a POS (abbreviation of Point of Sales) system.

A typical example of the double sided panel display unit is illustrated in FIG. 1 of the drawings, and is designated in its entirety by reference numeral 1. The doubled sided panel display unit I is under the control of a display controller 2, and displays the same visual images on both sides thereof. The double sided panel display unit 1 largely comprises a couple of single sided panel displays 1a and 1b, and a spacer member 1c. The single sided panel displays 1a and 1b are arranged in back to back, and the spacer member 1c is inserted between the soldering surfaces of the single sided panel displays 1a and 1b. Both single sided panel displays 1a and 1b are identical in structure with each other, and each single sided panel display 1a or 1b comprises a printed wiring board 1d for mounting integration circuit devices as well as a luminescent display panel 1e. Each of the luminescent displays 1e has two elongated display areas, and each elongated display area displays twenty digits each associated with a comma or a decimal point. The font indicative of each digit is formed by thirty five dots arranged in seven rows and five columns. Each of the single sided panel display 1a or 1b comprises substrates 1f, and aluminum spots are patterned on the substrate for providing anode patterns 1g. Fluorescent substance covers the anodes 1g on the substrates 1f, and grid members 1h are registered with the fluorescent films over the anodes 1g in spacing relation. Filaments 1i are further provided in spacing relation with the grid members 1h, and the filaments 1i is heated for radiating thermion. Grid voltage level is sequentially applied to the grid members 1h in a time sharing manner, and the thermion is accelerated toward the associated anode pattern 1g. When the thermion impacts against the anode patterns, the fluorescent film partially becomes luminant, and the digits, the commas and the decimal point are displayed on the elongated display areas. The two elongated display areas of one of the single sided panel displays 1e provide data information to customers on the front side F, and the two elongated display areas of the other single sided panel display 1e provide the same data information on the rear side R.

However, a problem is encountered in the prior art double sided panel display unit 1 in large number of components. Namely, each anode pattern consists of 35 dots for a font, a comma and a decimal point, and are, accordingly, driven by 37 anode driver circuits. Since the two rows are concurrently driven in the time sharing manner, it is necessary for the single sided panel display 1e to have 74 anode driver circuits. Moreover, twenty digits need twenty grid driver circuits, and other components such as power sources, the display controller 2, the filament power controller, the grid voltage controller are incorporated in the prior art double sided panel display unit 1. Since the prior art double sided panel display unit are constituted by two single sided panel displays 1e, the components are doubled either in number or in current driving capability. Thus, the prior art double sided panel display I is fabricated from a large number of components.

Another prior art double sided panel display unit is shown in FIG. 2, and largely comprises a single sided panel display 3a accompanied with a printed wiring board 3b for the associated integrated circuit devices, and a mirror panel 3c. The single sided panel display 3a is similar in structure to each single sided panel display 1e except for a transparent substrate 3d, and the transparent substrate 3d is formed of ITO (abbreviation of Indium Tin Oxide). The single sided panel display 3a provides data information to customers on the front side F, and the transparent substrate 3d transfers the visual images on the front side F to the mirror panel 3c for providing the same information to an operator on the rear side R. The prior art double sided panel display unit 3 thus arranged needs a relatively small number of components, because only one set of integrated circuit devices are necessary for the prior art double sided panel display unit 3. However, the mirror panel 3c should be obliquely arranged with respect to the transparent substrate 3d, and the prior art double sided panel display unit 3 tends to be thick rather than the prior art double sided panel display unit 1.

SUMMARY OF THE INVENTION

It is therefore an important object of the present invention to provide a double sided panel display unit which is thin and fabricated from a small number of components.

To accomplish the object, the present invention proposes to supply light to from a transparent substrate of a luminescent panel display a liquid crystal display.

In accordance with the present invention, there is provided a double sided panel display unit comprising: a) a luminescent panel display having a-1) a transparent substrate, a-2) a plurality of anode patterns formed on the transparent substrate, a-3) a fluorescent film covering the plurality of anode patterns on the transparent substrate, a-4) a plurality of grid members provided in spacing relation with the plurality of anode patterns, and sequentially applied with a grid voltage level for causing the fluorescent film to produce visual images in cooperation with the plurality of anode patterns, and a-5) a filament means provided in spacing relation with the plurality of grid members, and heated for sequentially radiating thermion toward the plurality of anode patterns; b) a liquid crystal shutter provided in front of the luminescent panel display, and responsive to a first control signal for turning on and off; c) a pair of polarizing plates provided on both sides of the liquid crystal shutter, and different in angle of polarization at about 90 degrees from each other, the .pair of polarizing plates being allowing the visual images to display while the liquid crystal shutter turns on; and d) a liquid crystal display unit provided at the back of the luminescent panel display, and supplied with light from the luminescent panel display through the transparent substrate for producing visual images similar to the visual images produced by the luminescent panel display in the presence of a second control signal.

BRIEF DESCRIPTION OF THE DRAWINGS

The features and advantages of the double sided panel display unit according to the present invention will be more clearly understood from the following description taken in conjunction with the accompanying drawings in which.

DESCRIPTION OF THE PREFERRED EMBODIMENTS

First Embodiment

Figure 3:
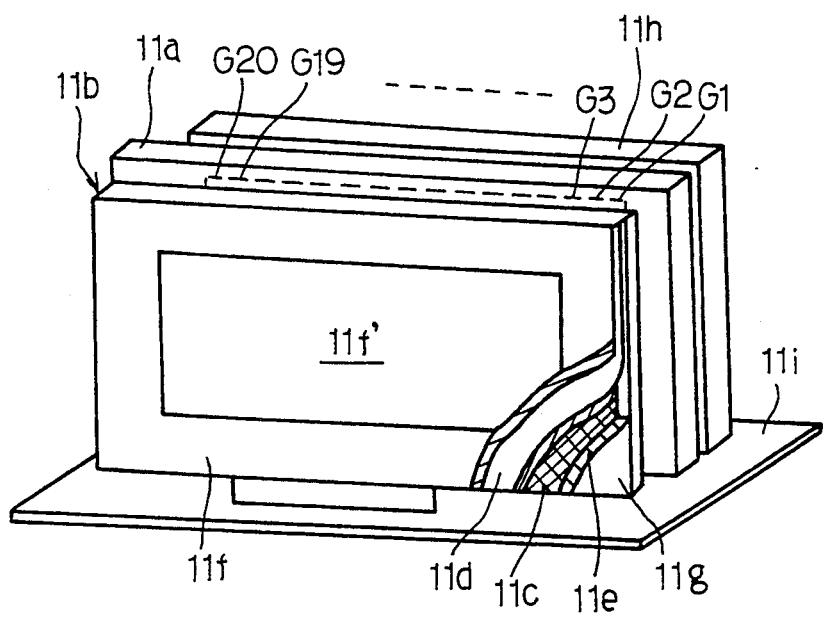
FIG. 3 is a partially cut-away perspective view showing the structure of a double sided panel display unit according to the present invention.

Referring first to FIG. 3 of the drawings, a double sided panel display unit 11 embodying the present invention comprises a single sided panel display 11a of the luminescent type similar to the prior art single sided panel display 3a, and, accordingly, the substrate of the single sided panel display 11a is transparent. In this instance, the transparent substrate is formed of ITO, and a plurality of anode patterns covered with a fluorescent film, a plurality of grid members G1, G2, G3, ..., G19 and G20 and a filament array are incorporated in the single sided luminescent panel display 11a. The single sided panel display 11a has two elongated display areas each capable of producing twenty fonts, and each of the fonts is formed by 35 dots, a comma and a decimal point. However, structure and behavior of the single sided luminescent panel display 11a is similar to those of the prior art, and no further description is incorporated for the sake of simplicity.

A liquid crystal shutter 11b is provided in front of the single sided panel display 11a, and comprises liquid crystal 11c filled between two transparent glass plates 11d and 11e. Two polarizing plates 11f and 11g are respectively attached to the transparent glass plates 11d and 11e, and the polarizing plates 11f and 11g are different in angle of polarization at 90 degrees from each other. The liquid crystal 11c is netted in FIG. 3 for better understanding, and the polarizing plate 11f provides a display window 11f'.

A liquid crystal display unit 11h is further provided at the back of the single sided luminescent panel display 11a, and the single sided luminescent panel display 11a serves as a source of light for the liquid crystal display unit 11h. Since the structure of the liquid crystal display unit 11h is well known in the art, no further description is incorporated hereinbelow.

Figure 4:
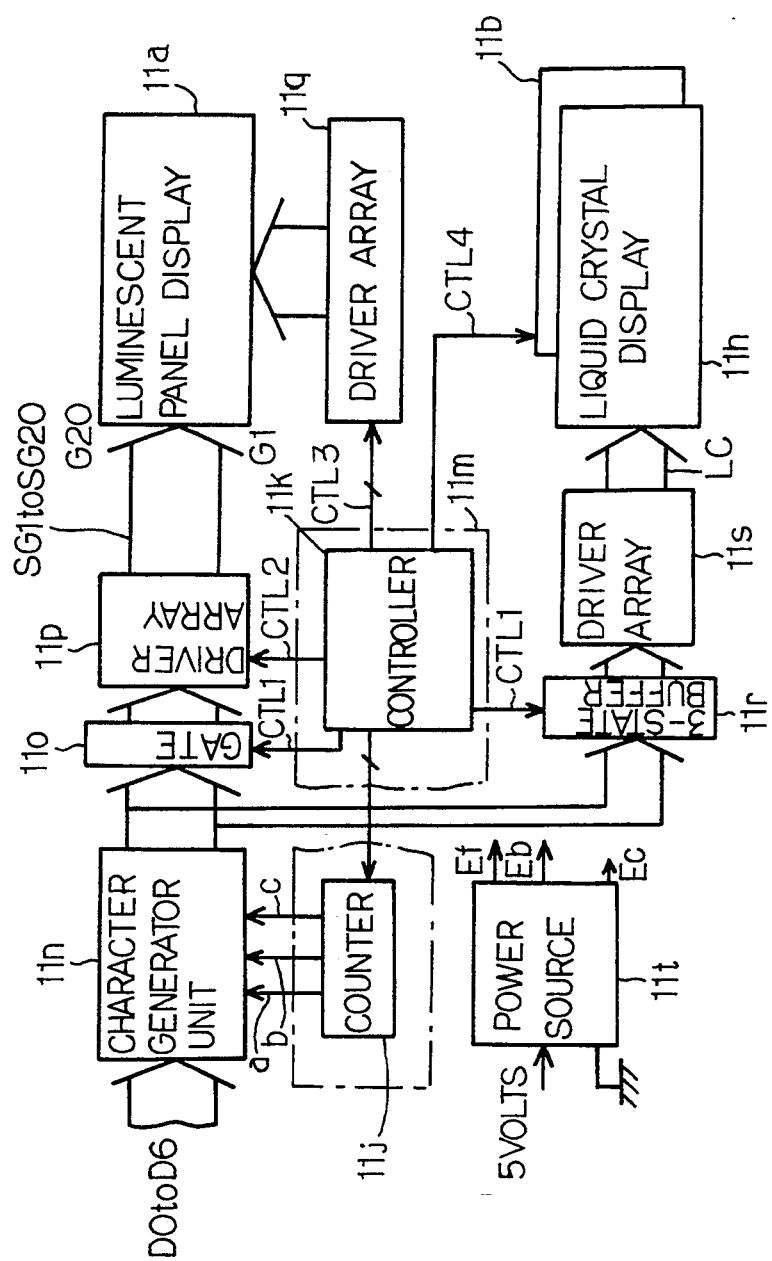
FIG. 4 is a block diagram showing the circuit arrangement of a control unit associated with the double sided panel display unit shown in FIG. 3.

A printed wiring board 11i is provided in association with the single sided luminescent panel display 11a, the liquid crystal shutter 11b and the liquid crystal display unit 11h. As will be seen from FIG. 4, various integrated circuit devices are mounted on the printed wiring board 11i, and a counter 11j and a controller 11k are implemented by a microprocessor 11m. The microprocessor 11m executes a program sequence memorized in a memory system (not shown), and produces visual data bits D0 to D6 indicative of visual image information, address bits a, b and c for a character generator unit 11n, a gate control signal CTL1 for a gate unit 11o, control signals CTL1 and CTL2 for driver arrays 11p and 11q, and a control signal CTL4 for the liquid crystal shutter 11b, and the signal CTL5 is further supplied to a three state buffer unit 11r. The gate units 11o and 11r are complementarily responsive to the control signal CTL1, and an output signal Sout of the character generator unit 11n is selectively supplied through the gate units 11o and 11r to the driver array 11p as well as a driver array 11s associated with the liquid crystal display unit 11h. The driver array 11p sequentially produces grid voltage signals SG1 to SG20 on the basis of the output signal Sour, and the driver array 11s also produces panel driver signals LC from the output signal Sout. A power source 11t is provided for the component units and circuits, and selectively distributes electric powers Ef, Eb and Ec thereto. The electric power Ec is about 60 volts, and is used for the grid voltage signals SG1 to SG20 sequentially applied to the grid members G1 to G20 of the single sided luminescent panel display 11a at 125 Hz for producing a single frame.

Figure 5:
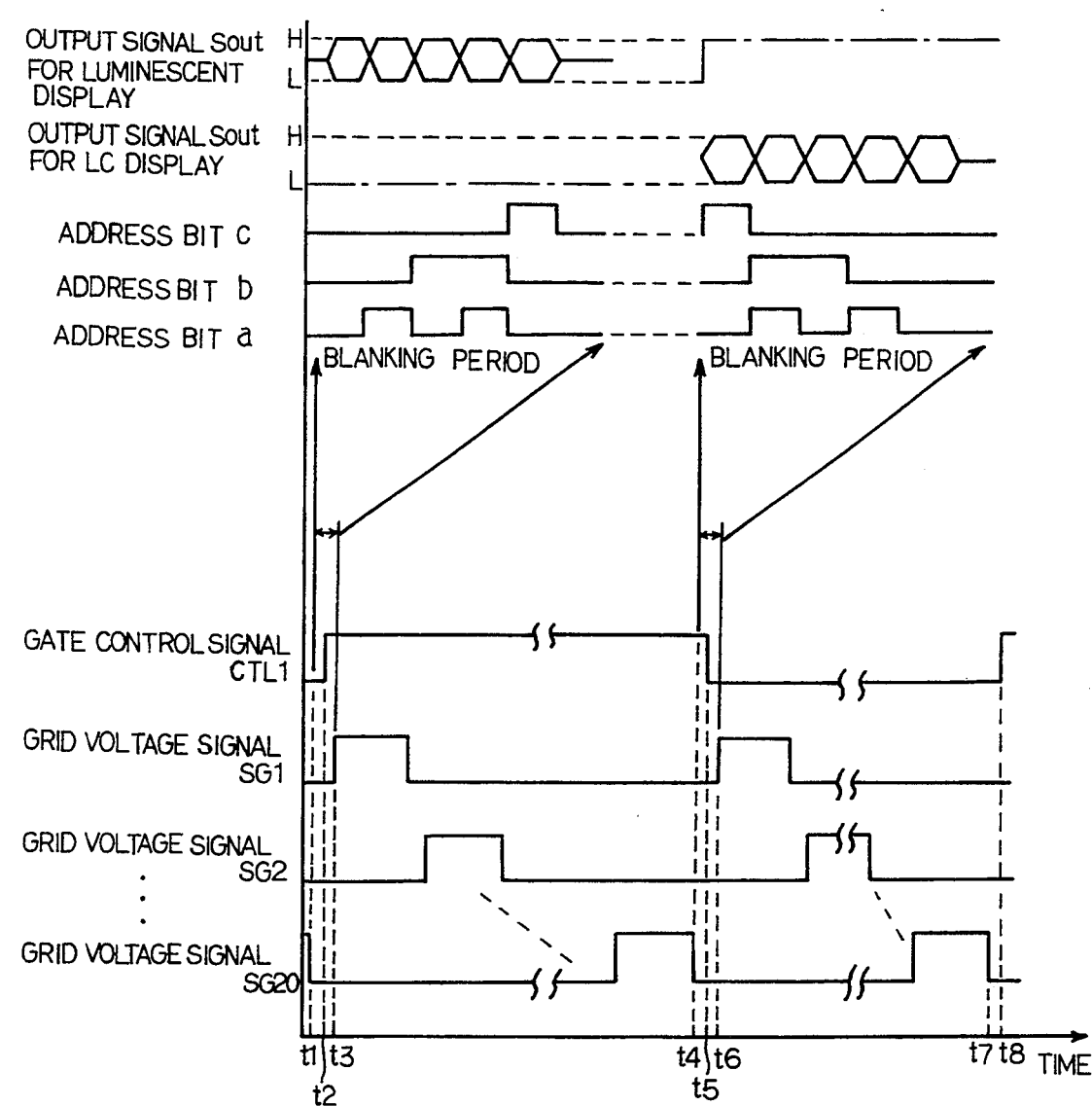
FIG. 5 is a timing chart showing the control sequence of the double sided panel display unit shown in FIG. 3.

FIG. 5 illustrates a control sequence for the double sided panel display unit 11. However, the abscissa indicative of time is different in scale between the visual data D0 to D6/ the address bits a to c and the control signal CTL4/ grid voltage signal G1 to G20.

The control sequence is largely broken down into phase one for the display window 11f' and phase two for the liquid crystal PANEL DISPLAY 11h. Font data indicative of visual images have been already memorized in the character generator unit 11n, and the visual images are numerals and letters each accompanied with a comma and a decimal point, if necessary. If the previous phase two is completed at time t1 and the phase one starts at time t2, the time interval between time t1 and time t3 is a blanking period, and the microprocessor 11m shifts the gate control signal CTL1 to a high voltage level and the control signal CTL4 to an active level. The gate control signal CTL1 of the high voltage level allows the gate unit 11o to turn on and the three-state buffer unit 11r to turn off, and the control signal CTL4 of the active level causes the liquid crystal shutter 11b to be open. In the blanking period, the microprocessor 11m sequentially increments address of the character generator unit 11n indicated by the address bits a to c from "0" to "4", and pieces of the visual image information are sequentially read out from the character generator unit 11n. Namely, the output signal Sout indicative of pieces of visual image information are sequentially supplied from the character generator unit 11n through the gate unit 11o to the driver array 11p. However, the driver array 11s is blocked from the output signal Sour in the blanking period of the phase one.

The read-out of the pieces of visual image information is completed at time t3, and the driver array 11p sequentially supplies the grid voltage signals SG1 to SG20 to the plurality of grid members of the luminescent panel display 11a from t3 to t4. The filament array radiates thermion towards the anode patterns, and the grid voltage signals SG1 to SG20 sequentially control the associated grid members to reproduce the visual images from time t2 to time t4. In this instance, the time interval between times t2 to t5 is about 4 milliseconds.

A blanking period for the phase two starts at time t4, and is completed at time t6. The microprocessor 11*m* shifts the gate control signal CTL1 to the low voltage level at time t5, and the three-state buffer unit 11*r* turns on; however, the gate unit 11*o* turns off. Since the microprocessor 11*m* shifts the control signal CTL4 to an inactive level, and the liquid crystal shutter 11*b* is turned off. In this situation, the display window 11*f* is isolated from the luminescent panel display 11*a*, and any visual image is reproduced on the display window 11*f*. The microprocessor 11*m* sequentially decrements the address from "4" to "0" from time t4 to time t5, and the pieces of visual image information are sequentially read out from the character generator unit 11*n* in inverted manner. The output signal Sour indicative of the pieces of visual image information is supplied through the three-state buffer unit 11*r* to the driver array 11*s*, and the driver array 11*s* produces the driver signals LC for the liquid crystal display 11*h* so as to reproduce the same visual images on the liquid crystal display 11*h*. From time t6 to time t7, the microprocessor 11*m* supplies the control signal CTL2 to the driver array 11*p*, and the driver array 11*p* supplies the grid voltage signals SG1 to SG20 to the grid members. With the grid voltage signals SG1 to SG20, the grid members allow the fluorescent film over all of the dots of every anode pattern to be luminant, and the luminescent panel display 11*a* serves as a source of light for the liquid crystal display 11*h*. The time interval between times t5 to t8 is about 4 milliseconds in this instance. The double sided panel display unit 11 repeats the phase one and the phase two, and displays visual images on both sides thereof. If the microprocessor 11*m* supplies the visual data bits D0 to D6 indicative of other visual image information, the visual images on both sides are changed in accordance therewith.

Figure 1:
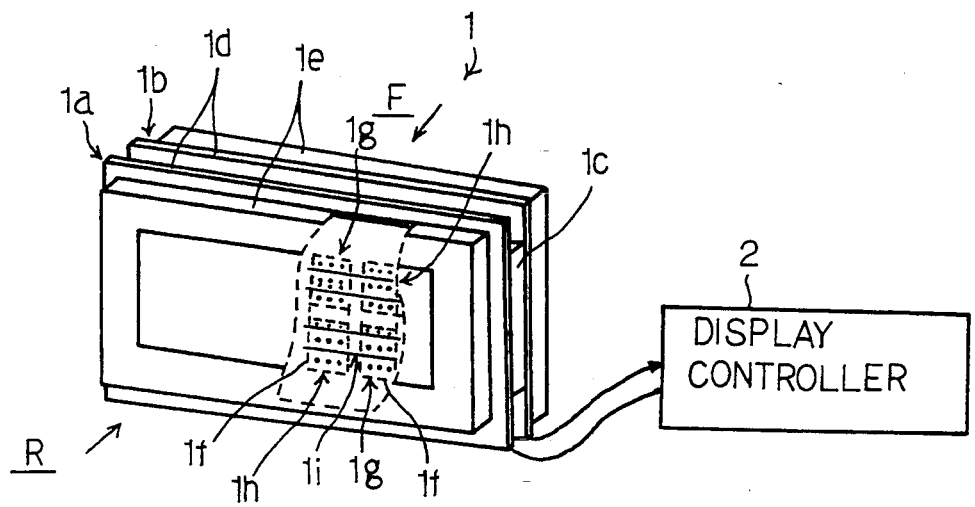
FIG. 1 is a partially cut-away perspective view showing the structure of the prior art double sided panel display unit.
Figure 2:
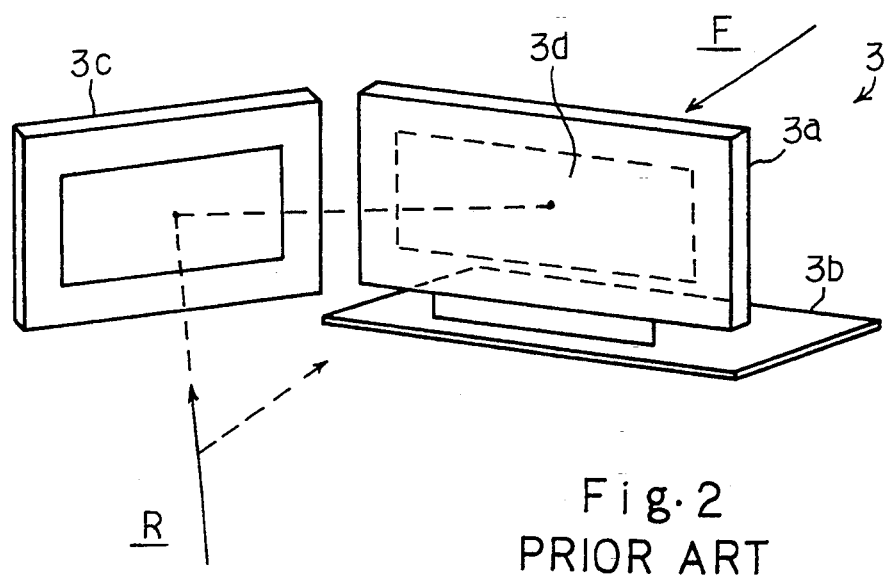
FIG. 2 is a perspective view showing the structure of another prior art double sided panel display unit.

The double sided panel display unit 11 according to the present invention needs only one single sided luminescent panel display 11*a*, and the components are relatively small rather than the prior art example shown in FIG. 1. Moreover, the liquid crystal display 11*h* is so thin that the double sided panel display unit 11 can be decreased in thickness.

Second Embodiment

Figure 6:
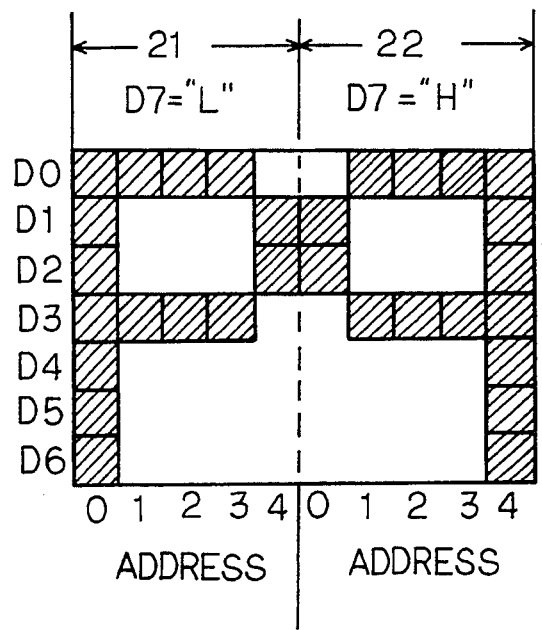
FIG. 6 is a front view showing a mapping for a character generator incorporated in another double sided panel display unit according to the present invention.

Turning to FIG. 6 of the drawings, a data map established in the character generator unit 11*n* is illustrated, and the character generator unit 11*n* is broken down into two areas 21 and 22. The arrangement of the double sided panel display unit implementing the second embodiment is similar to that of the first embodiment, and no description is incorporated hereinbelow for avoiding repetition. If a data bit D7 associated with the visual data bits D0 to D6 is in logic "L" level, the visual data bits D0 to D6 are sequentially written into the addresses "0" to "4" of the area 21. However, if the data bit D7 is changed to logic "H" level, the data bits D0 to D6 are written into addresses "0" to "4" of the area 22 in inverted manner. For this reason, the data bits D0 to D6 of the area 21 is symmetric with the data bits D0 to D6 of the area 22.

In operation, while the double sided luminescent panel display 11 is in the phase two, the grid members allow the fluorescent film over the anode patterns to be luminant for reproducing image pattern indicated by the pieces of visual image information in the area 22. Since the luminant dots are overlapped with the visual images on the liquid crystal display 11*h*, the visual images are emphasized because of strong contrast between the visual images and the background.

Although particular embodiments of the present invention have been shown and described, it will be obvious to those skilled in the art that various changes and modifications may be made without departing from the spirit and scope of the present invention.

What is claimed is:

1. A double sided panel display unit having a phase one and a phase two which alternately take place, said unit comprising:
   a) a luminescent panel display having
      a-1) a transparent substrate,
      a-2) a plurality of anode patterns formed on said transparent substrate,
      a-3) a fluorescent film covering said plurality of anode patterns on said transparent substrate,
      a-4) a plurality of grid members provided in a spaced relation with said plurality of anode patterns, and having a grid voltage level sequentially applied thereto for causing said fluorescent film to produce visual images in cooperation with said plurality of anode patterns during said phase one and under the control of a controller, and
      a-5) a filament means provided in a spaced relation with said plurality of grid members, and heated for sequentially radiating thermions toward said plurality of anode patterns;
   b) a liquid crystal shutter provided in front of said luminescent panel display, and responsive to a first control signal for turning on and off;
   c) a pair of polarizing plates provided on both sides of said liquid crystal shutter, and different in an angle of polarization at about 90 degrees from each other, said pair of polarizing plates allowing said visual images to be displayed while said liquid crystal shutter turns on during said phase one; and
   d) a liquid crystal display unit provided at the back of said luminescent panel display, and supplied with light from all of said anodes of every anode pattern incorporated in said luminescent panel display through said transparent substrate for producing visual images similar to the visual images produced by said luminescent panel display during periods while said controller supplies a second control signal thereto during said phase two so that the liquid crystal of said liquid crystal display unit selectively turns on for passing said light,
   said liquid crystal shutter turning on responsive to said first control signal and while the luminescent panel display reproduces said visual images during said phase one, said liquid crystal shutter turning off responsive to said second control signal and while the liquid crystal display unit reproduces said visual images.

2. A double sided panel display unit as set forth in claim 1, in which said luminescent panel display reproduced visual images in an inverted manner with respect to said visual images reproduced on said liquid crystal display unit.

3. A double sided panel display unit as set forth in claim 2, in which said visual images are represented by a visual image signal sequentially supplied from a character generator unit to one of said luminescent panel display and said liquid crystal display unit.

* * * * *